May 31, 1960 R. H. WISE 2,938,401
MOTION-TRANSMITTING MECHANISM
Filed Oct. 2, 1957

INVENTOR.
RALPH H. WISE
BY Redrow & Recktenwald
ATTORNEYS

United States Patent Office 2,938,401
Patented May 31, 1960

2,938,401

MOTION-TRANSMITTING MECHANISM

Ralph H. Wise, Tampa, Fla., assignor, by mesne assignments to The Anderson Company, a corporation of Indiana Filed Oct. 2, 1957, Ser. No. 687,658

9 Claims. (Cl. 74—424.8)

This invention relates to a motion-transmitting mechanism and more particularly to a mechanism embodying nut-and-screw mechanical movement means as the principal elements thereof.

In its broadest aspects, the invention contemplates the use of a power-transmitting mechanism including a low friction, high efficiency form of nut-and-screw assembly wherein minor loads, sometimes even the weight of the nut itself, on a substantially vertically positioned screw is sufficient to cause the nut to creep or travel down the screw. This problem is particularly noticeable in such structures as a vehicle door having nut-and-screw driven window-lift mechanisms of the type shown in my issued U.S. Patent No. 2,714,005 wherein certain types of mountings will permit the weight of the window or the vibration of the vehicle to retract the window into the door. This problem exists in any device wherein the present-day high efficiency, low friction nut-and-screw types of assemblies are employed.

It is, therefore, a principal object of this invention to overcome the above-noted disadvantages of the prior art and to provide an improved motion-transmitting assembly wherein free movement of the nut along the screw is resisted.

It is another object of this invention to provide a motion-transmitting mechanism having a built-in resistance calculated to prevent creeping and certain other movements between the nut and screw without materially effecting the efficiency of the operating mechanism.

It is a further object of this invention to provide a motion-transmitting mechanism having means for resisting free rotation, either of the screw or of the carrier during inoperative periods of use of the driving mechanism.

It is still a further object of this invention to provide a unique motion-transmitting mechanism comprised of a minimum number of components which can be economically manufactured and assembled on a production basis and which can be easily and quickly installed.

And it is still an additional object of this invention to provide a motion-transmitting mechanism which is relatively light in weight, compact in size, and substantially noiseless in operation.

Additional objects and advantages of the invention will become apparent after the description hereinafter set forth is considered in conjunction with the drawing annexed hereto.

Figure 1:
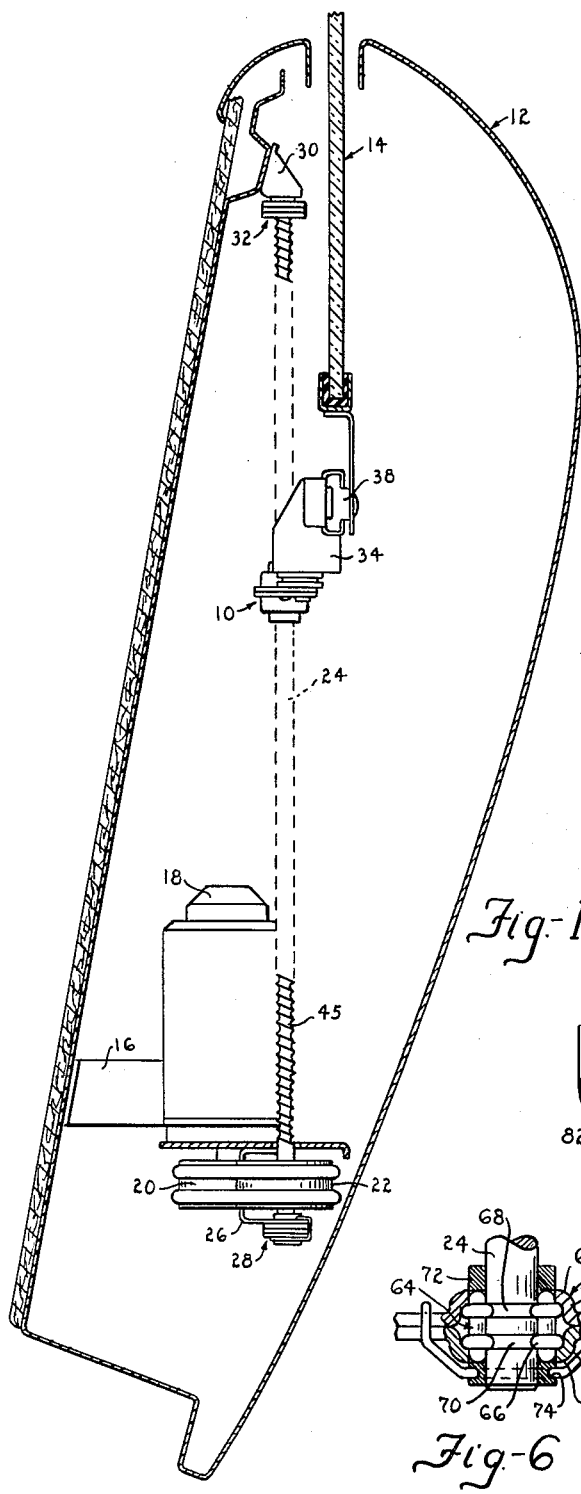
Figure 1 is an elevational view of the inner side of a vehicle door showing the application of the invention to the window structure thereof.

Referring specifically to the drawing wherein the various reference numerals refer to corresponding parts throughout the several views, the numeral 10 designates a motion-transmitting element illustrated in combination with a door or body panel 12 of an automotive vehicle for raising and lowering a window panel 14 relative thereto. Mounted within the inside of the body panel 12, near the lower extremities thereof, is a bracket 16 which supports in a vertical position a reversible electric motor 18 having a pulley 20 keyed to the drive shaft thereof. A pair of drive belts are seated in a pair of grooves in the pulley 20 and coact with corresponding grooves in a pulley 22 keyed to the lower end of the threaded driving shaft 24 for reversible rotation thereof. The bracket 16 also has a depending portion 26 which is adapted to support a bearing element 28 on the lower portion of said driving shaft 24 such as to position said shaft against radial and axial thrust loads. A second bracket 30 is mounted to the body panel 12 near the upper portion thereof and has a bearing element 32 similar to the lower bearing element 28 for rotatably supporting the upper portion of the driving shaft 24.

The motion-transmitting element 10 has a bracket 34 connected to the outer end portions thereof by suitable means and is adapted to support a hanger assembly 38 carried by the lower portion of the window 14 for transmitting the linear motion of the motion-transmitting element to the window 14.

Figure 2:
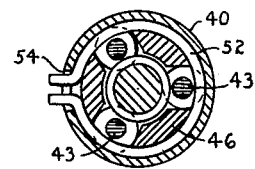
Figure 2 is a cross-sectional view taken on the line 2—2 in Figure 3.
Figure 3:
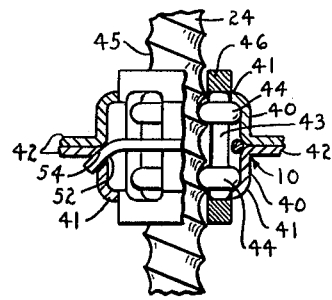
Figure 3 is a view partially broken away and in section of a nut and screw assembly showing one form of my invention.
Figure 4:
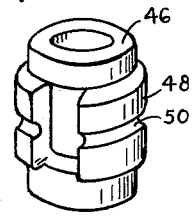
Figure 4 is a perspective view of the carrier member of Figure 3.

One operative embodiment of my invention is illustrated in Figures 2, 3 and 4 wherein the motion-transmitting element 10 is composed of a pair of mating tubular members 40 having inwardly disposed abutment surfaces or raceways 41 axially positioned relative thereto. A pair of mating flanges 42 are formed integrally with the tubular members 40 and are secured together in face-to-face relationship to form the load-carrying extensions of the motion-transmitting element 10. A plurality of bearing elements 43 are mounted within the tubular members 40 and have axially spaced radially enlarged toroidal surfaces adapted to be positioned within the tubular members 40 with the bearnig surfaces 44 engaging with the abutment surfaces 41 of the tubular members. The outwardly disposed end portions of the bearing elements 43 and the central portion thereof have a diameter less than the diameters of the bearing surfaces 44 in the illustrated form. The toroidal bearing surfaces 44 also engage with a thread 45 of the threaded driving shaft 24. A cylindrical carrier member 46 formed of nylon-type material or the like is positioned for relative rotation between the tubular members 40 and the threaded shaft 24 in position to receive the bearing elements 42 in axially elongate slots formed in said carrier. The axes of the slots lie substantially parallel to the axis of the drive shaft 24. A structure generally resembling the just-described structure is shown, described and claimed in my copending application Serial No. 585,651, filed May 18, 1956.

In high efficiency nut-and-screw mechanisms, a problem has developed which is objectionable from not only the manufacturer's viewpoint but also from the customer's viewpoint, namely, the tendency for the mechanism to creep under a load or under vibration from the supporting structure when the driving motor of the nut-and-screw mechanism is inoperative. This problem is easily illustrated with the vehicle door assembly shown in Figure 1 wherein the weight of the window or pressure from a person leaning on the window edge or vibration of the vehicle as it moves along the highway with the motor 18 inoperative will cause the motion-transmitting element 10 to travel down the screw 24 into a further retracted position within the door 12. This travel is caused by the load on the tubular members bearing against one side of the toroidal surfaces of the bearing elements 43 which bearings have another side in engagement with the sloping surface of the thread 45 on the screw 24. The load causes the bearing elements 43 to rotate about their axes as they roll down the sloping surface of the thread 45 which in turn rotates the carrier 46 and screw 24 relative to each other such that the motion-transmitting or nut member 10 creeps down the screw 24.

To overcome the just-enumerated problem, the carrier 46, as best shown in Figure 4, has a central portion 48 of slightly enlarged diameter which is adapted to be assembled within the shoulder portions 41 of the tubular members 40 and has a concentric peripheral groove 50 formed around the outer surface of substantially the central portion thereof. A spring or brake member 52 made of wire or the like has its end portions extending through an aperture 54 formed in one of the tubular members 40 and has its body portion passing around the carrier 46 in the groove 50. The brake member 52 is adapted to slightly grip the material of the carrier 46 in the groove and is seated between the carrier 56 and the walls of the tubular members 40 such as to resist free rotation of the carrier 46 relative to the tubular member 40. The brake member in effect holds the carrier against rotation until a certain predetermined force is exceeded whereupon the carrier breaks loose from the brake member and rotates freely. Once the resistance of the brake member 52 is overcome the carrier rotates freely and functions as if no brake member were present. The brake member will reduce or substantially eliminate the tendency of the motion-transmitting element 10 to creep or slowly move along the axis of the thread under the weight of the motion-transmitting element 10 and the weight of the load being supported thereby without materially effecting the overall efficiency of the unit.

Figure 5:
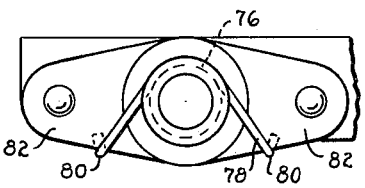
Figure 5 is a plan view of a modified form of my invention.
Figure 6:
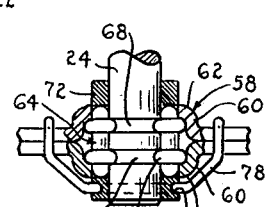
Figure 6 is a view partially broken away and in section of the modification shown in Figure 5.

A modified form of my invention is illustrated in Figures 5 and 6 wherein a bearing device 58, similar to bearing device 28 in Figure 1, is carried by the lower end portion of the threaded driving shaft 24 for supporting the shaft 24 against axial and radial thrust loads. The bearing 58 is composed of a pair of tubular members 60 having inturned abutment shoulders or raceways 62 on the outer end portions thereof. A plurality of bearing elements 64 are positioned within the tubular member 60 and have enlarged toroidal bearing surfaces 66 bearing against the abutment surfaces 62. The toroidal surfaces 66 also nest in a pair of axially spaced continuous grooves or raceways 68 and 70 formed in the peripheral surfaces of the threaded member 24. A carrier member 72 is rotatably received between the tubular members 60 and the shaft 24 and has a plurality of elongate slots formed therein for receiving the bearing elements 65. The slots are formed with their major axes aligned substantially parallel to the axis of the shaft 24 and receive the bearing elements 65 therein in freely rotating relationship.

One of the exposed end portions of the carrier 72 has a continuous groove 74 formed around the peripheral surface thereof for receiving a portion 76 of a resilient wire brake member 78. Said brake member is bent in such a way as to have its end portions 80 hooked over the one edge portion of the flanges 82 on the tubular members 60. The brake member is adapted to engage with the surfaces of the grooves in the carrier 72 in such a way as to resist free rotation of the carrier 72 relative to the tubular members 60. The carrier 72 is adapted to break loose from the brake member 78 when a predetermined turning force is exerted on the shaft 24.

With the bearing member 58 mounted on the lower portion of the driving shaft 24, it will become apparent that the shaft 24 will not be permitted to rotate freely relative to the tubular members 60 due to the resistance created by the brake member 78 in the groove 74 of the carrier member 72. In this manner, when a load such as a window 14 is carried by the bracket 34 on the motion-transmitting element 10, the window will not creep or move downwardly along the shaft 24 without positive drive from the reversible motor 18. That is, the load on the bearing elements in the motion-transmitting element 10 will tend to rotate the bearing elements which will rotate the carrier and shaft relative thereto. The rotation of the shaft will be resisted by the brake element 78 in the bearing 58 at the base of the shaft so that the motion-transmitting element will not be permitted to move down the stationary shaft whereupon the window will be held in a fixed position. Upon actuation of the motor 18 the frictional resistance between the brake 78 and carrier 72 will be overcome so that the shaft and carrier are free to rotate relative to each other in an efficient manner.

The resistance between the brake means 52 and carrier 46 or the brake 72 and carrier 46 is calculated to be an amount slightly in excess of the force tending to rotate the shaft under the load carried by the element 10.

It is to be understood that only one braking device such as either 52 or 78 is needed in an installation and its location in either the nut or bearing depends entirely upon the choice of the designer of the equipment. It is further to be understood that the brake 78 could be used on the carrier 46 or the brake 52 used on the carrier 72 without departing from the spirit of my invention. As an incidental feature of this invention, the braking device will contribute to the dissipation of excess forces incidental to slowing down and stopping the screw member upon deactivation of the motor 18. That is, when the motor is stopped, certain excess forces must be dissipated so as to prevent the motor from being jammed against its stop means, such as the window frame. The instant invention contributes to the dissipation of said forces.

From the foregoing, it will be obvious that I have obtained the objects of my invention and have provided an improved motion-transmitting mechanism wherein creep or gradual movement of the load relative to the shaft is prevented. My improved device incorporates a novel braking means for resisting certain minor load forces which will not materially effect the final efficiency of the device.

Having thus described my invention, it is obvious that various other modifications may be made in the same without departing from the spirit of my invention; hence, I do not wish to be understood as limiting myself to the exact form, construction, arrangement and combination of parts herein shown and described or uses mentioned.

I claim:

1. A load-bearing assembly comprising a mounting member having opposed portions oppositely offset to define a pair of axially spaced raceways, a carrier member rotatably positioned within said mounting member, roller means carried by said carrier member and bearing against said spaced raceways, and means carried by the mounting member and acting on said carrier member for resisting free rotation of said carrier member relative to said mounting member.

2. A motion-transmitting mechanism comprising driving and driven members, one of said members being threaded along the length thereof, the other of said members having opposed portions oppositely offset to define a pair of axially spaced raceways, a carrier member rotatably positioned within said other member, roller means carried by said carrier member and bearing against said spaced raceways, and brake means restrained by the other of said members and acting on said carrier member for resisting free rotation of said carrier member relative to said driving and driven members.

3. A load-bearing assembly comprising a rotatable shaft, a mounting member rotatably receiving said shaft and having opposed portions oppositely offset to define a pair of axially spaced raceways, a carrier member rotatably positioned within said mounting member, roller means carried by said carrier member and operatively engaging with said spaced raceways and said shaft, and means held by said mounting means and draggingly engaging with a surface of said carrier member for adding a predetermined resistance to the free rotation of said carrier member relative to the mounting member and the shaft.

4. In a device of the class described, driving and driven members disposed for relative rotational and longitudinal movement, one of said members having peripheral portions defining a helical thread of appreciable longitudinal lead, the other of said members comprising a nut element provided with a medial aperture freely receiving said one member therethrough, a plurality of thread-engaging elements retained by said nut element for free rotation relative thereto, carrier means freely rotatable between said nut element and said threaded member for retaining said thread-engaging elements in operative position relative to the nut element and the threaded member, and means held by said nut element and acting on said carrier means to resist free rotation of the carrier means relative to the nut element.

5. In a device of the class described, driving and driven members disposed for relative rotational and longitudinal movement, one of said members having peripheral portions defining a helical thread of appreciable axial lead, the other of said members comprising tubular means having inwardly extending abutment surfaces, a plurality of bearing elements retained by said tubular means in rolling contact with said abutment surfaces and said helical thread, carrier means freely rotatable between said tubular means and said threaded member for retaining said bearing elements in position relative thereto, and brake means carried by said tubular means and engaging in a groove in said carrier means to resist free rotation of the carrier means relative to the nut element.

6. A load-bearing assembly comprising a rotatable shaft having continuous raceways formed around one end portion, a mounting member rotatably receiving said shaft and having opposed portions oppositely offset to define a pair of axially spaced raceways, a carrier member rotatably positioned within said mounting member, roller means carried by said carrier member and operatively engaging with said spaced raceways and said continuous raceways, and means held by said mounting member acting on said carrier member for resisting free rotation of said carrier member relative to said mounting member whereby the shaft is held against free rotation.

7. A load-bearing assembly comprising a threaded member, a mounting member axially movable relative to said threaded member and having opposed portions oppositely offset to define a pair of axially spaced raceways, a carrier member rotatably positioned within said mounting member, roller means carried by said carrier member and bearing against said spaced raceways, and means engaging with the mounting member and seating in a continuous groove formed in the outer surface of the carrier member for resisting free rotation of said carrier member relative to the mounting member whereby the mounting member is prevented from freely translating along the threaded member.

8. A load-bearing assembly comprising a mounting member having opposed portions oppositely offset to define a pair of axially spaced raceways, a carrier member rotatably positioned within said mounting member, roller means carried by said carrier member and bearing against said spaced raceways, and a spring wire looped around the middle portion of said carrier and having its ends passing through an opening in said mounting member for resisting free rotation of said carrier member relative to said mounting member.

9. A load-bearing assembly comprising a rotatable shaft, a mounting member rotatably receiving said shaft and having opposed portions oppositely offset to define a pair of axially spaced raceways, a carrier member rotatably positioned within said mounting member with at least one end of the carrier projecting beyond said mounting member and formed with a circumferential groove, roller means carried by said carrier member and operatively engaging with said spaced raceways and said shaft, and a spring clip having an intermediate portion engaged in said circumferential groove of the carrier, the ends of said clip being anchored to said mounting member.

References Cited in the file of this patent

UNITED STATES PATENTS

| | | |
|---|---|---|
| 2,701,478 | Riess | Feb. 8, 1955 |
| 2,714,005 | Wise | July 26, 1955 |
| 2,731,261 | Drum | Jan. 17, 1956 |
| 2,768,532 | Russell | Oct. 30, 1956 |